Oct. 3, 1961    W. B. WILLIAMS    3,002,812
MANUFACTURE OF DEFLUORINATED PHOSPHATES
Filed Feb. 19, 1959
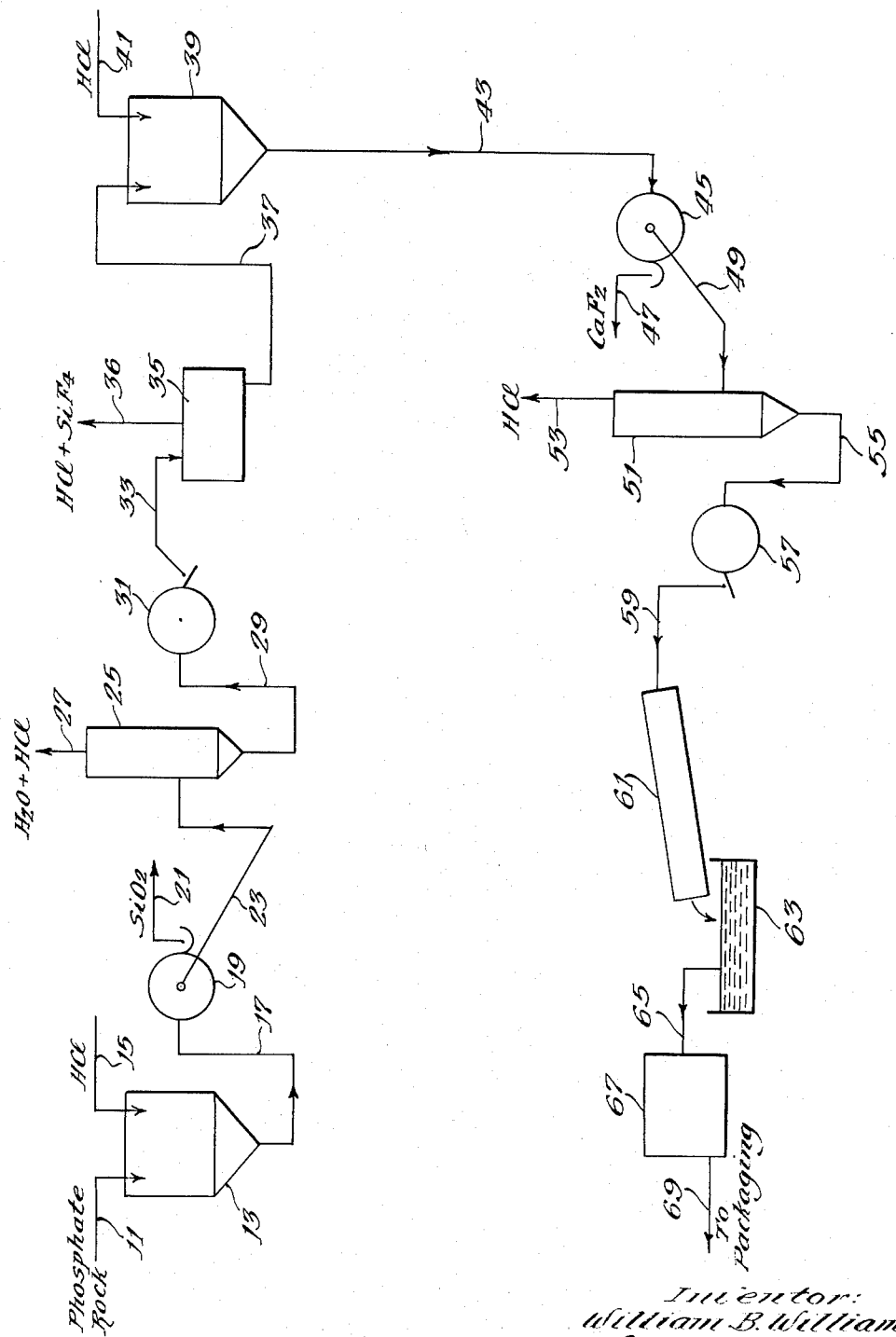
Inventor:
William B. Williams
By Ernest V. Haines
Attorney 3,002,812
MANUFACTURE OF DEFLUORINATED PHOSPHATES
William B. Williams, Birmingham, Ala., assignor to International Minerals & Chemical Corporation, a corporation of New York
Filed Feb. 19, 1959, Ser. No. 794,383
5 Claims. (Cl. 23—109)

The present invention generally relates to the manufacture of defluorinated phosphates. More particularly, it relates to the manufacture of defluorinated phosphates useful as animal feed or animal feed supplement providing both needed phosphorus and calcium, and useful as fertilizer.

Mineral phosphates in all of the commercially exploited natural deposits in the United States and in most foreign countries occur in the form of apatite. Apatite is a phosphate of lime containing varying amounts of chlorine, fluorine, and hydroxyl. It is generally represented by the formula $Ca_5(F.Cl.OH)(PO_4)_3$. The phosphorus pentoxide content in a saleable ore varies from 30% to 36%. The fluorine content may reach as high as 3.8% and is generally about 3.3%. Because of the serious detrimental effects caused by continued feeding of significant amounts of fluorine to animals, particularly cattle, 3.3% is too high an amount of fluorine. It is, therefore, generally necessary to reduce the fluorine content to below about 0.1% in a phosphate material containing about 30% $P_2O_5$ before it is suitable for use as an animal feed.

The availability of the phosphate is also an important factor when the phosphate is used as an animal feed. By availability, as used herein, is meant that the phosphate is in the orthophosphate state and is preferably soluble in neutral ammonium citrate in which state the phosphate can best be assimilated by an animal.

Accordingly, it is an object of the present invention to provide a process for manufacturing a phosphate product of low fluorine content.

It is another object of the present invention to provide a process for manufacturing a phosphate product suitable for use as an animal feed ingredient from phosphate rock and hydrochloric acid.

A further object of the present invention is to provide a process for manufacturing a phosphate product of low fluorine content from phosphate rock and hydrochloric acid, which process may readily be installed in a conventional commercial plant.

These and other objects of the present invention will become apparent as the description of the invention progresses.

In accordance with the process of this invention, phosphate rock is digested in hydrochloric acid solution, solids are separated out of the resultant digestion mass to produce a substantially solids free liquid, the liquid is subjected to evaporation to reduce the liquid to a solid, the solid is digested in an aqueous medium, solids are separated out of the resultant digestion mass to produce a substantially solids free liquid, and the liquid is subjected to evaporation to reduce the liquid to a substantially solid product which is substantially free of fluorine.

The raw phosphate rock used in the present process may be in finely divided form; however, the reaction with acid is so rapid that large particles may also be used. The phosphate rock is digested with hydrochloric acid to form an aqueous solution containing monocalcium phosphate, phosphoric acid and calcium chloride. The phosphate rock contains fluorine as fluorapatite and the rock also contains silica as an impurity. The silica content varies with the source of the phosphate rock and the benefication process used to upgrade the rock, but will generally be within the range of from about 1% to about 10% by weight. With silica and fluorine present in the phosphate rock charge, fluosilicic acid and silica will also be present in the resultant digestion mass.

The hydrochloric acid is added to the phosphate rock in quantities sufficient to decompose substantially all of the phosphate in the rock to form phosphoric acid. At least the theoretical or stoichiometric amount of hydrochloric acid should be used, and preferably an excess of at least 10% should be added, and still more preferably, an excess of at least 25% should be added. The hydrochloric acid is desirably dilute and is preferably used in concentrations below 30%, although concentrated 30% acid may be used in some instances. Commercially available standard concentrated 30% HCl hydrochloric acid is preferably diluted before use. The reaction rate is rapid in dilute and concentrated acid. The reaction or decomposition of the phosphate rock in the hydrochloric acid occurs at ambient temperature. Higher temperatures may, however, be used when desired to increase the reaction rate.

The reaction rate is rapid, however, the phosphate rock and hydrochloric acid mixture is preferably agitated to aid the reaction. The time of contact should be sufficient to substantially completely convert all of the phosphate in the rock to water soluble form as monocalcium phosphate and/or phosphoric acid. The time necessary for substantially complete reaction is, of course, dependent upon the temperature, concentration of the acid, degree of agitation, etc. Generally, the rock and acid should be contacted for at least one-half hour, and preferably from one hour to six hours. Longer periods of time, however, may be used when desired.

After substantially complete reaction between the phosphate rock and the acid, remaining solids or residue are separated from the resultant digestion mass. The remaining solids may be removed in any suitable manner such as centrifuging or filtering. The residue will consist predominantly of silica, undigested phosphate rock, organic material, gangue minerals, etc. Any suitable type of centrifuging and/or filtering apparatus may be used. The resultant digestion mass is frequently difficult to filter due to the finely divided nature of the remaining solids and, therefore, vacuum filtering apparatus is preferably used.

The resultant substantially solids free liquid is then evaporated to reduce the liquid to a dried solid. Converting the liquid to a dried solid may be accomplished by a one-step process wherein the liquid is heated to a temperature above its boiling point until all of the liquid evaporates leaving a dried solid. It is, however, preferred to convert the resultant substantially solids free liquid to a dried solid by evaporating substantially all of the free water from the liquid in an evaporator and completing the removal of water in dryers such as, for example, a drum dryer or a rotary dryer. The resultant substantially solids free liquid is converted to a solid at a temperature above the boiling point of the liquid and is preferably dried by heating at a temperature of at least 250° F. and more preferably at a temperature of from about 275° F. to about 350° F. The heating step drives off hydrogen chloride in the liquid and also drives off some of the fluorine in the original phosphate rock charge as silicon tetrafluoride. The hydrogen chloride removed during the heating may be recovered and recycled to the first hydrochloric acid digestion step. The substantially dried solid contains a phosphate of calcium, calcium chloride and some calcium fluoride.

The dried solid is of lower fluorine content than the phosphate rock charge and may be sufficiently low in fluorine content to be used as an animal feed ingredient, It is, however, preferred to reduce the fluorine content to lower levels. In accordance with the present invention, the dried solid is digested in an aqueous medium. The phosphate and the calcium chloride in the dried solid are soluble; however, the calcium fluoride is relatively insoluble. The digestion in aqueous medium may be conducted in any suitable manner. The solid may be slurred in water to dissolve the soluble components or the solid may be leached with water, or any other suitable method may be used. The contact of the aqueous solution with the solid may be effected at ambient temperature; however, elevated temperatures may be used when desired.

The dissolving may be effected in water. The digestion mass however is preferably acidic and when necessary, hydrochloric acid is added to lower the pH below 6.0 and preferably below .5. The hydrochloric acid is preferably used to insure the conversion of the phosphate to a water soluble form as monocalcium phosphate or phosphoric acid. The solids and aqueous medium mixture is preferably agitated to facilitate the dissolving. The time of contact should be sufficient to substantially completely convert all of the dicalcium phosphate in the solid to water soluble monocalcium phosphate and/or phosphoric acid. The time necessary for complete reaction is, of course, dependent upon the temperature, degree of agitation, etc. Generally, the time will be from about one-half to one hour. Longer periods of time may, however, be used when desired.

After contacting the solids with the aqueous medium, the remaining residue is separated from the resultant reaction mass. The residue will consist predominantly of calcium fluoride and will also contain some dicalcium phosphate. Any suitable type of filtering and/or centrifuging equipment may be used to separate the residue from the reaction mass; however, vacuum filtering methods are preferred. The residue is preferably recycled to the first digestion zone wherein the phosphate rock is contacted with hydrochloric acid. The resultant substantially solids-free liquid is evaporated to produce a substantially dry solid which may be recovered as a product of the process. The dried solid is substantially free of fluorine and is suitable for use as an animal feed or as a fertilizer. The dried solid consists predominantly of calcium phosphate and calcium chloride.

The dried solid is, however, preferably calcined at a temperature above 1900° F. and more preferably at a temperature within the range from about 200° F. to the fusion point of the solid. The calcination is conducted to further drive out fluorine so as to have a P/F ratio of greater than 180. The calcination is preferably conducted without substantial fusion. After the calcination the calcined material, while still at a temperature above 1900° F., is rapidly quenched. The quenching may be accomplished by spraying water on the hot solid, by dropping the hot solid into water, or by any other suitable method. By the rapid quench the phosphate is retained in the alpha tricalcium phosphate form, which is more suitable for use as a fertilizer and for animal feed supplement.

After the quenching step, the material may be further processed if desired or may be dried and packaged as a final product of the process.

The invention will be more fully understood from the following description taken in conjunction with the attached diagrammatic flow sheet, it being understood that the foregoing flow sheet illustrates but one method of taking advantage of the invention and that other equivalent methods will be apparent to those skilled in the art.

Referring to the flow sheet, phosphate rock of about 76 BPL, having a $SiO_2$ content of about 4%, and of a mesh size in the range of from about 20 mesh to about 150 mesh passes through line 11 into a mix tank 13. A 20% hydrochloric acid solution is simultaneously introduced into the mix tank 13 through line 15. The phosphate rock and acid are maintained in a state of agitation in the mix tank. After about 2 hours of reaction time, the resultant reaction mass or slurry is withdrawn from mix tank 13 through line 17 and is filtered on filter 19. The residue, which contains silica, is removed from the filter 19 through line 21. The filtrate is removed from the filter 19 through line 23 and is introduced into evaporator 25. In the evaporator 25 the filtrate is concentrated and water and HCl are removed overhead through line 27. The evaporation is effected to produce a substantially saturated solution which is withdrawn through line 29 and passed to a drum dryer 31 which reduces the concentrated filtrate to a substantially dry solid. The dry solid is scraped off of the drum dryer and is passed via line 33 to a rotary dryer 35 which further dries the solid and drives hydrogen chloride and silicon tetrafluoride out of the material which is removed via line 36. The drying in the rotary dryer is at a temperature of about 300° F.

The dried solid from the rotary dryer is conveyed via line 37 into a leach tank 39 wherein the dried solid is dissolved in a dilute 10% hydrochloric acid solution introduced through line 41. The dried solid and hydrochloric acid solution are maintained in a state of agitation in the leach tank 39. After about 1 hour, the resultant solution is withdrawn from leach tank 39 through line 43 and is filtered on drum filter 45.

The solid material in the resultant solution in line 43 contains solid calcium fluoride which is scraped off of the drum filter 45 and is removed through line 47. The filtrate is removed from the filter 45 through line 49 and is introduced into evaporator 51. In the evaporator 51, the filtrate is concentrated and water and HCl are removed overhead through line 53. The concentration is effected to produce a substantially saturated solution which is withdrawn through line 55 and passed to a drum dryer 57. The drum dryer 57 reduces the concentrated filtrate to a solid which is scraped off of the drum dryer. The solid scraped off of the drum dryer is substantially free of fluorine and is suitable as an animal feed and may be packaged directly. In order to further drive fluorine out of the material, the solid material is removed from the drum dryer 57 and is passed via line 59 into a kiln 61 in which the solid material is calcined at a temperature of about 2500° F. The calcined material, which is predominantly alpha-tricalcium orthophosphate, drops out of the lower end of the kiln and is rapidly cooled in water in a quench tank 63. The quenched material is removed from quench tank 63 through line 65, dried in dryer 67, and sent to packaging via line 69. The packaged material is low in fluorine, has a P/F ratio of greater than 180, and has high availability and is, therefore, suitable for use as a fertilizer and/or animal feed.

In order to give a fuller understanding of the invention, but with no intention to be limited thereto, the following specific example is given.

*Example*

One ton of phosphate rock having a $P_2O_5$ content of 34% is delivered to a digester and 2.35 tons of 30% hydrochloric acid are added. 0.67 ton of a filter cake recovered in a second filtration is also recycled to the digestor. The rock, filter cake and acid are reacted at ambient temperature for three hours. During this period the contents of the reactor are agitated. After three hours, 0.5 ton of water is added to the digestor.

The contents of the digestor are withdrawn and filtered. 4.48 tons of filtrate and 0.04 ton of filter cake are separately recovered. The filtrate is evaporated to dryness and baked in an oven at 275° F., producing 1.91 tons of dried solid.

The dried solid is placed in a leach tank to which are also added 2.56 tons of water and 2.0 tons of wash filtrate recycled from the subsequent filtration step. The contents of the leach tank are agitated for one hour. After this period of time, the contents of the leach tank are filtered. The filtering produces 0.67 ton of filter cake which is recycled to the first reactor. The filtrate is evaporated to dryness, calcined at 2500° F., quenched in a water bath, dried and packaged. 0.79 ton of product having a 41% $P_2O_5$ content is produced. The product has a P/F ratio of over 180 and high fertilizer availability.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A process for manufacturing a phosphate product of low fluorine content from phosphate rock containing fluorine and silica which comprises digesting said phosphate rock in sufficient hydrochloric acid solution to decompose substantially all of the phosphate in said rock to form phosphoric acid, separating remaining solids from the resultant digestion mass to produce a substantially solids free liquid, subjecting said substantially solids free liquid to evaporation to produce a first solid of lower fluorine content than said phosphate rock, said solid containing a phosphate of calcium and calcium fluoride, digesting said first solid in an aqueous medium selected from the group consisting of water and hydrochloric acid solution to dissolve substantially all of said phosphate of calcium, separating remaining solids containing calcium fluoride from the resultant digestion mass to produce a substantially solids free liquid, and subjecting said substantially solids free liquid to evaporation to produce a substantially dried solid phosphate product having a fluorine content substantially lower than the fluorine content of said first solid and suitable for use as an animal feed ingredient.

2. A process according to claim 1 wherein the first evaporation is effected by heating to a temperature of at least 250° F.

3. A process for manufacturing a phosphate product of low fluorine content suitable for use as an animal feed and as a fertilizer from phosphate rock containing fluorine and silica which comprises digesting said phosphate rock in sufficient hydrochloric acid solution to decompose substantially all of the phosphate in said rock to form phosphoric acid, separating remaining solids from the resultant digestion mass to produce a substantially solids free liquid, subjecting said substantially solids free liquid to evaporation to produce a first solid of lower fluorine content than said phosphate rock, said first solid containing a phosphate of calcium and calcium fluoride, digesting said first solid in a hydrochloric acid solution having a pH below 6.0 to dissolve substantially all of said phosphate of calcium, separating remaining solids containing calcium fluoride from the digestion mass to produce a substantially solids free liquid, subjecting said substantially solids free liquid to evaporation to produce a substantially dried solid, calcining said substantially dried solid at a temperature within the range of from about 2200° F. to the fusion point of said solid without substantial fusion, and rapidly quenching the calcined solid while still at a temperature above 1900° F. to produce a solid phosphate product having a fluorine content substantially lower than the fluorine content of said first solid and high availability suitable for use as an animal feed ingredient.

4. A process for manufacturing a phosphate product of low fluorine content from phosphate rock containing fluorine and silica which comprises digesting said phosphate rock in hydrochloric acid solution, said hydrochloric acid solution being used in at least the amount stoichiometrically required to convert substantially all of the phosphate in said rock into phosphoric acid, separating remaining solids from the resultant digestion mass to produce a substantially solids free liquid, subjecting said liquid to evaporation by heating to a temperature within the range of from about 250° F. to about 350° F. to produce a solid, digesting said solid in dilute hydrochloric acid solution, said hydrochloric acid solution being used in at least the amount stoichiometrically required to convert substantially all of the phosphate in said solid into phosphoric acid, separating remaining solids from the resultant digestion mass to produce a substantially solids free liquid, and subjecting said liquid to evaporation to produce a substantially dried solid, calcining said solid at a temperature within the range of from about 2200° F. to the fusion point of the solid without substantial fusion, and rapidly quenching the calcined solid while still at a temperature above 1900° F. to produce a phosphate product having a fluorine content substantially lower than the fluorine content of said phosphate rock and high availability suitable for use as an animal feed ingredient.

5. A process for manufacturing a phosphate product of low fluorine content from phosphate rock containing fluorine and silica which comprises digesting said phosphate rock in hydrochloric acid solution, said hydrochloric acid solution being used in at least the amount of stoichiometrically required to convert substantially all of the phosphate in said rock into phosphoric acid, separating remaining solids from the resultant digestion mass to produce a substantially solids free liquid, subjecting said liquid to evaporation by heating to a temperature within the range of from about 275° F. to about 350° F. to produce a solid containing a phosphate of calcium, calcium chloride and calcium fluoride, digesting said solid in dilute hydrochloric acid solution, said hydrochloric acid solution being used in at least the amount stoichiometrically required to convert substantially all of the phosphate in said solid into phosphoric acid, separating remaining solids from the resultant digestion mass to produce a substantially solids free liquid, subjecting said liquid to evaporation to produce a substantially dried product, calcining said dried product at a temperature above 2200° F. without substantial fusion, and rapidly quenching the calcined solid while still at a temperature above 1900° F. to produce a solid product having a P/F ratio greater than about 180.

References Cited in the file of this patent

UNITED STATES PATENTS

| | | |
|---|---|---|
| 2,134,013 | Turrentine | Oct. 25, 1938 |
| 2,143,438 | Fox | Jan. 10, 1939 |
| 2,778,722 | Hollingsworth | Jan. 22, 1957 |